United States Patent [19]
Chang

[11] Patent Number: 4,541,246
[45] Date of Patent: Sep. 17, 1985

[54] LIMITLESS HEAT SOURCE POWER PLANTS

[76] Inventor: Yan P. Chang, 181 Sherbrooke Ave., Williamsville, N.Y. 14221

[21] Appl. No.: 557,899

[22] Filed: Dec. 5, 1983

Related U.S. Application Data

[63] Continuation-in-part of Ser. No. 406,321, Aug. 9, 1982, abandoned.

[51] Int. Cl.⁴ ............................................. F01K 17/00
[52] U.S. Cl. ................................. 60/648; 60/641.1; 60/651; 60/656
[58] Field of Search ............... 60/641.1, 641.7, 641.9, 60/651, 648, 671, 646, 656

[56] References Cited

U.S. PATENT DOCUMENTS

3,892,103 7/1975 Antonelli ..................... 60/648 X
4,292,809 10/1981 Bjorklund ..................... 60/651 X
4,444,015 4/1984 Matsumoto et al. ............. 60/648

Primary Examiner—Stephen F. Husar
Attorney, Agent, or Firm—Christel, Bean & Linihan

[57] ABSTRACT

A method of employing the thermal energy from essentially limitless sources, such as the ocean or the atmosphere, to produce mechanical work or electricity by power plants wherein; the fluid from the limitless heat source is used to heat the working fluid of a prime mover through a heat exchanger; the effluent cooled fluid from the said heat exchanger may be employed directly or indirectly to extract the exhaust heat of the prime mover; and the said effluent cooled fluid from the said heat exchanger may also be used simultaneously or successively for the conversion of saline water into fresh water, or dirty water into usable water.

8 Claims, 11 Drawing Figures

FIG. 3 — Fluid flow

FIG. 1 — Heat flow

LIMITLESS HEAT SOURCE POWER PLANTS

BACKGROUND OF THE INVENTION

This invention which is a continuation-in-part of application Ser. No. 406,321 filed Aug. 9, 1982 under the same title, now abandoned, relates to power plants and, more particularly, to a method for the production of power by utilizing the thermal energy from so-called passive or inert heat sources, such as the ocean and the atmosphere, together with the production of fresh water without significant additional cost.

The earliest successful attempt to tap the thermal energy of the ocean was made during 1925 to 1929 by G. Claude. Since then, various modifications of the Claude power plant have been proposed. As an example, the system of prior U.S. Pat. No. 3,928,145 wherein low pressure steam at a temperature of 77 degrees F. is generated from the warm surface of the ocean and condensed at a temperature of 59 degrees F. by the cold water drawn from a depth of from 1 to 2 km below the ocean surface. The maximum thermodynamic efficiency (Carnot efficiency) of such system is 3.3%. The production of one pound steam, i.e. the heat input of 1050 Btu, requires cooling of 292 pounds of warm surface water if 3.3 degrees F. of temperature difference is allowed for the evaporation, or cooling 117 pounds of warm water if a temperature difference of 9 degrees F. is assumed. About the same amount of the ocean water, far below the surface, also has to be pumped. Another example is the system of prior U.S. Pat. No. 4,087,925 wherein the Claude power plant is modified by using a pressurized condensible vapor as the working medium. The prime mover can be smaller than that of the original Claude power plant. When the energy of the large volume of water necessary to operate the power plant is considered, the overall efficiency will probably be less than two percent. Due to the low efficiency and associated large piping systems, the Claude power plant and those based thereon have not become commercially practical.

With respect to the conversion of saline water into fresh water, there are two general methods commonly used: evaporation and freezing. Great interest in the latter has recently been revived due to its low energy consumption rate and much decreased requirements for metallic heat transfer surface, as compared with the former. The freezing method can be divided into two classes, one in which water is itself the refrigerant and one in which the refrigerant is butane or halogenated ethane as taught by prior U.S. Pat. No. 3,835,658. For producing 1000 gallons of fresh water from sea water, about 7 gallons of oil will be needed by the evaporation process and about 3 gallons of oil will be needed by the freezing process.

SUMMARY OF THE INVENTION

In the conventional approach of power production, a heat source is always considered as a closed heat reservoir where only heat can cross its boundary. In the present invention, the ocean or the atmosphere, is treated as an open heat reservoir where mass and heat can cross its boundary.

It is to be understood that the thermal energy of the ocean and atmosphere is almost limitless and freely available. Therefore, the overall thermal efficiency of the whole power plant using such a heat source needs not be a factor for much concern. Instead, the thermal efficiency of the prime mover is of great importance with respect to the first cost and the operation and maintenance costs of the power plant. In order to obtain higher thermal efficiency of the prime mover, the power cycle has to operate in a large temperature range. This is one of the goals to be achieved in this invention.

In accordance with this invention, the prime mover may be a turbine operating in a closed cycle. The working medium may be pressurized air or other permanent gas and the cycle can operate between the temperature of the limitless source and the cryogenic temperature of the employed gas. A pressurized condensible vapor can also be used as the working medium, provided that the evaporation and condensation are not impeded at low temperatures. More specifically, in the following description, initially the warmer ocean will be considered as the heat source and the working medium as a gas. Then similar teachings will be applied to the atmosphere as a heat source with only slight modification, as will become apparent herein below.

The ocean water gives heat to the working gas through a large heat exchanger from which the water leaves at low temperature near to the freezing point corresponding to a desired pressure. This cold water is then used to remove the exhaust heat from the prime mover, through a heat pump. Consequently, the prime mover is working between a large temperature difference while the heat pump operates between a small temperature difference.

Essentially, then, the method according to the present invention includes the steps of; passing fluid from a substantially limitless heat source through a first heat exchanger in heat exchange relation with a fluid for driving a prime mover; applying the effluent cooled fluid from said first heat exchanger to remove the exhaust heat from the prime mover. The cold fluid effluent from the first heat exchanger is used simultaneously or successively for the desalinization of seawater or for the purification of waste water by a freezing process.

When the atmosphere is used as a heat source, the temperature of the air effluent from the said first heat exchanger can be further reduced by passing through an expanding device so that the cold air obtained can thus be used directly for removing the exhaust heat from the prime mover.

Other features, additional objects and many of the attendant advantages of this invention will readily become apparent from the ensuing detailed description of the preferred embodiments.

BRIEF DESCRIPTION OF THE DRAWINGS

For a fuller understanding of the present invention reference should be made to the following detailed description thereof taken in conjunction with the accompanying drawings, wherein.

DETAILED DESCRIPTION OF THE PREFERRED EMBODIMENTS

Figure 1:
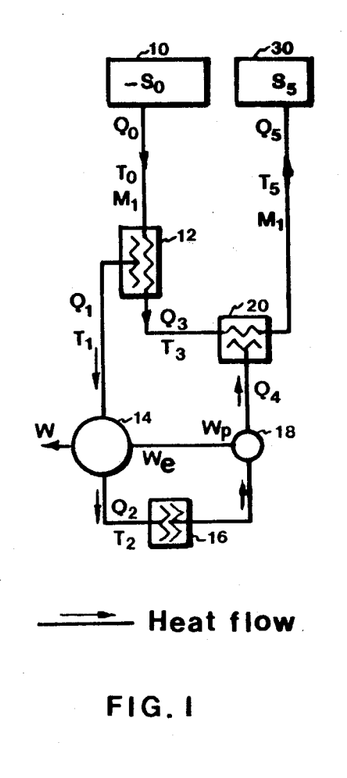
FIG. 1 is a flow diagram, in schematic form, of a power plant depicting the basic concept of using the ocean or the atmosphere as an open heat reservoir and a vapor-refrigeration heat pump to produce mechanical work according to the first and second laws of thermodynamics.

Referring, now, in detail to the drawings and to FIG. 1 wherein the operating principles and flow diagram of a power plant equipped with a heatpump of the vapor-refrigeration type is illustrated. The heat source depicted by 10 may be the ocean or the atmosphere which is treated herein as an open reservoir. For brevity, the fluid (ocean water or air) that flows out from the reservoir 10 will be referred to as source fluid. The source fluid at temperature $T_o$ flows at the rate of $M_1$ pound mass per unit of time through a large heat exchanger 12, from which it leaves at temperature $T_3$. The flow of the source fluid is effected largely by the gravitational force, as will become apparent in the ensuing preferred embodiments. An engine 14 receives heat from the heat exchanger 12 at the rate of $Q_1 = M_1(h_0 - h_3)$ where $h_0$ and $h_3$ are the enthalpies of the source fluid at temperatures $T_0$ and $T_3$, respectively. The engine rejects heat through a heat exchanger 16 at the rate of $Q_2$. This rejected heat $Q_2$ is removed by a heat pump 18, which requires mechanical work input at the rate of $W_p$ and delivers heat to the effluent cold water from the heat exchanger 12 at a rate of $Q_4$ through a heat exchanger 20. The rate of heat rejected to the environment 30 is thus, $Q_5 = Q_3 + Q_4 = M_1 h_3 + Q_4$ which is of lower grade (larger entropy) in comparison with $Q_0 = M_1 h_0$. Therefore, entropy is continuously produced to the universe. Since $T_0 > T_3 > T_2$ and if $\Delta T_e = T_1 - T_2 >> \Delta T_p = T_3 - T_2$, then net work can be done at the rate of $W = W_e - W_p$ where $W_e$ and $W_p$ designate the rate of work done by the engine 14 and the rate of work required by the heat pump 18, respectively. In the above description, it has been assumed that the effluent cold fluid from the heat exchanger 12 is sufficient to absorb $Q_4$ in the heat exchanger 20 which will be discussed later. With the above descriptions and the presumptions, the equality of the first law and the inequality of the second law of thermodynamics are satisfied:

$$Q_1 - Q_5 = W, \quad S_5 - S_0 > 0$$

It is to be noted that the environment 30 can be the ocean or the atmosphere. For instance, if the heat source is the ocean, the fluid effluent from the heat exchanger 20 can also be discharged to the ocean at a position far apart from the source 10 so that the thermodynamic state of the warmer source fluid will not be disturbed and hence the power plant is operating in a cycle. Clearly, the heat source of the system in FIG. 1 is the warmer fluid flowing out of reservoir 10, while the heat sink is the cooler fluid effluent from the heat exchanger 12. The environment 30 is actually a "dumping ground" of the fluid mass and the heat that is carried by the fluid.

Figure 2:
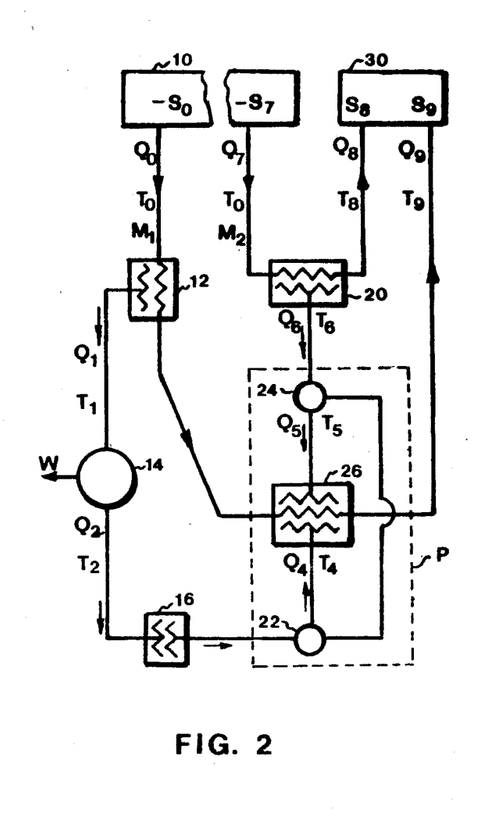
FIG. 2 is similar to FIG. 1 except that it illustrates the application of a absorption-refrigeration heat pump.

FIG. 2 shows a flow diagram employing a heat pump of absorption-refrigeration type. In FIG. 2 the heat source 10, the heat exchangers 12 and 16, the engine 14 and the environment 30 remain the same as those in FIG. 1. Exhaust heat $Q_2$ from engine 14 is removed by the heat pump, P, of the absorption-refrigeration type which is described by an equivalent system comprising an equivalent vapor-refrigeration heat pump 22, an equivalent engine 24 and a heat exchanger 26, a procedure usually employed in environmental engineering. The absorption-refrigeration heat pump draws energy from the heat source 10 by the mass flow rate $M_2$ of the source fluid. The equivalent engine 24 produces mechanical work at the rate of $W_e'$ to drive the equivalent vapor-refrigeration heat pump 22. The engine 24 and the heat pump 22 discharge heat through the heat exchanger 26 at the rates $Q_5$ and $Q_4$, respectively, to the cooled source fluid effluent from the heat exchanger 12. The source fluid which flows at the rate of $M_2$ takes heat out of the heat source at the rate of $Q_7$, rejects heat to the environment at the rate of $Q_8$ and gives heat at the rate of $Q_6$ to the engine 24 through heat exchanger 28. The source fluid at the mass flow rate of $M_1$ discharges heat at the rate of $Q_9 = Q_3 + Q_4 + Q_5$ to the environment. It is to be noted that $(S_8 + S_9) > (S_1 + S_7)$, whereby net entropy is produced to the universe. If the cold fluid effluent from heat exchanger 12 is sufficient to absorb $Q_4$ and $Q_5$, then net work can be produced at the rate of W. Thus, the following equality and inequality hold:

$$Q_0 + Q_7 = W + Q_8 + Q_5, \quad S_8 + S_9 - S_0 - S_7 > 0.$$

Figure 3:
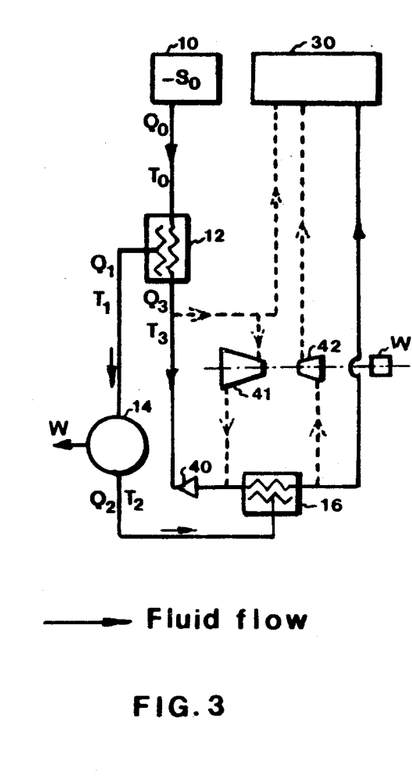
FIG. 3 is similar to FIG. 1 except that no heat pump is employed and the atmosphere is used as an open heat reservoir.

FIG. 3 shows the flow diagram, in schematic form of a power plant wherein the source reservoir 10 is atmosphere and the heat exchangers 12 and 16, the engine 14 and the environment 30 remain the same as those in FIGS. 1 and 2, except that the air effluent from the heat exchangers 12 is at the temperature $T_3$ slightly higher than the lowest temperature of the engine cycle. For this case, the heat pump is not needed and an expanding device 40 can be employed so that the temperature $T_3$ of the fluid effluent from the heat exchanger 12 can be further reduced to a value of a few degrees lower than $T_2$. This colder fluid is then used to remove the exhaust heat of the engine and dump the exhaust to the environment 30. Alternatively, as shown by dashed lines, turbine 41 and a scavenging pump 42 may be employed, so that extra useful work $W_7'$ can be extracted out of the cooled air effluent from the heat exchanger 12.

The crucial point of this invention in comparison with other ocean thermal power plants as cited earlier is that the warmer fluid entering the heat exchanger 12 is considered as the heat source while the same fluid effluent from the heat exchanger 12 at lower temperature becomes the heat sink. Similarly, the colder fluid effluent from the expansion device 40 in FIG. 3 is the heat sink of the power plant. To see that the said effluent cold fluid is the true heat sink even in the usual sense of Equilibrium Thermodynamics, one may imagine that the said effluent cooler fluid flows into a large tank (i.e., a reservoir) which has already contained the same fluid at the same temperature and the same pressure as those of the said effluent cold fluid. The fluid which flows continuously and steadily into and out of the said tank provides the same function as the coolant of any existing power plant, such as the cooling water of the condenser of a steam power plant and the deep-ocean water of the Claude power plant. Thus, the power plants depicted in FIGS. 1, 2 and 3 operate in a cycle, do mechanical work, produce entropy to the universe, and exchanges heat with two heat reservoirs, as required by the second law of thermodynamics. The second law has never stated that the heat sink must be one available in nature.

It can be readily conceived that the power plants in FIGS. 1-3 and all patented ocean thermal power plants are all operating in a cycle, doing mechanical work, producing entropy to the universe and coldness to the environment (since thermal energy has been extracted therefrom). The advantages of the present power plants are: (i) much higher thermal efficiency of the prime mover and hence much larger output (the overall thermal efficency of the whole power plant needs not be concerned since the heat source is free from cost); (ii) pumping system of deep-ocean water is eliminated and hence the power plant can be installed everywhere on the earth; and (iii) fresh water is a by-product.

Specific examples of more detailed power plants, including the conversion of seawater into fresh water, will now be discussed in conjunction with FIGS. 4 through 11.

Figure 4:
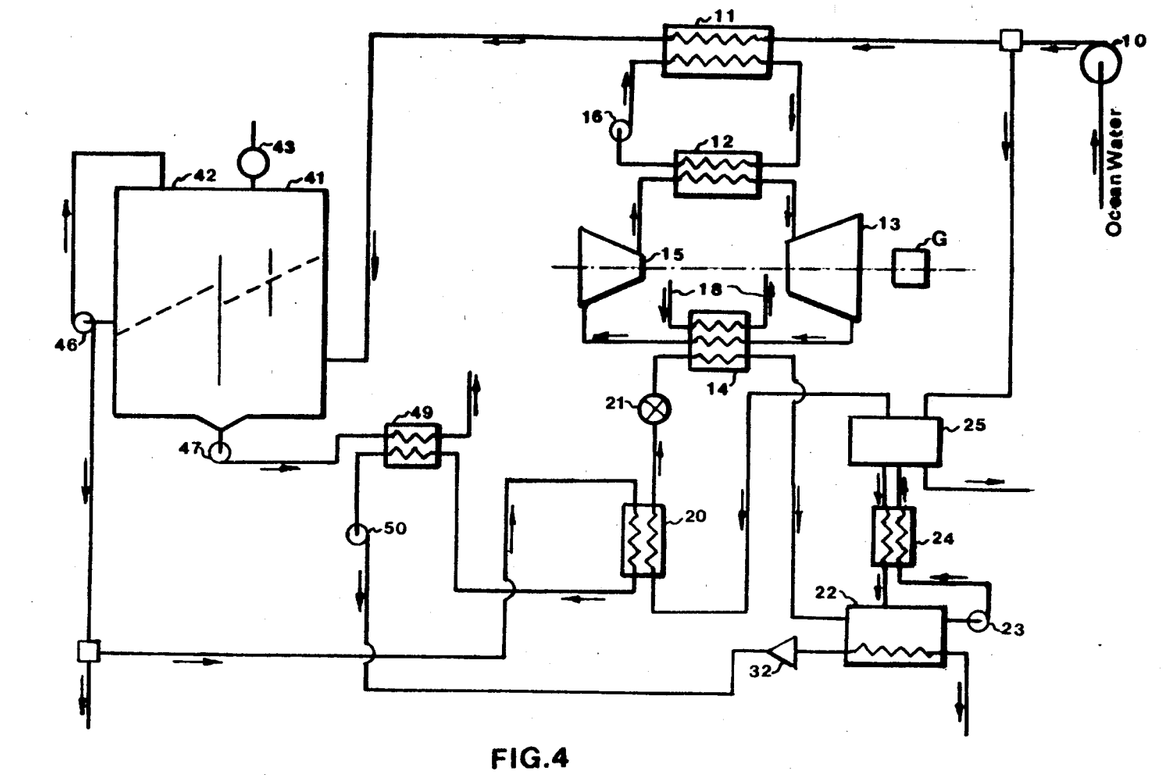
FIG. 4 is a flow diagram, in schematic form, of the power plant according to the invention using ocean water as the heat source and equipped with a heat pump of the absorption-refrigeration type for production of power and conversion of ocean water into fresh water.

Referring to FIG. 4, ocean water is delivered to the heat exchanger 11 by the pump 10. In the heat exchanger 11, the liquid of a volatile fluid is evaporated. The vapor of the volatile fluid is condensed in the heat exchanger 12, releasing heat to the working gas of the prime mover which is shown, schematically, as the combination of a compressor 15 and a turbine 13. Although use of the volatile fluid is not necessary from thermodynamic viewpoints, it is required for practical construction. The reason for this is that the heat exchanger 11 is quite large and, therefore, would be difficult to install in proximity to the prime mover. The heat exchangers 11 and other heat exchangers should be erected in such a position that the gravitational force can be utilized to have the cooled fluid flow downward and the heated fluid upward. The heated gas expands in the turbine 13 which drives a generated G, or the like.

When the working fluid leaves the turbine 13, it is cooled through the heat exchanger 14 which is also the evaporator of a heat pump and then enters the compressor 15, and the cycle repeats itself. The ocean water leaves the heat exchanger 11 at a temperature of a few degrees below the freezing point of the ocean water. This cold saline water enters immediately a separation tank 41, which is situated as close as possible to heat exchanger 11 in order to reduce pressure losses. The pressure in tank 41 is regulated by a valve 43. Ice crystals are formed and transported by a series of pans to a tank 42 where the entrained brine drips to the bottom and the crystals are washed by part of their own melt through the pump 46. The detailed description of the conversion of saline water into fresh water by the freezing process will not be given here, since the same is a well known process.

FIG. 4 also shows, in schematic form, the principal components of an absorption-refrigeration heat pump which includes the evaporator 14, an expansion valve 21, a condenser 20, a generator 25, an absorber 22, a pump 23, and a heat exchanger 24. Dephlegmators, rectifying devices and the like are not shown, since these are known to those skilled in the art. To accelerate the boiling of refrigerant in the generator 25 and the condensation of the refrigerant vapor in the condensor 20, a compressor of low compression ratio may be installed between the condenser 20 and the generator 25. If the generator 25 is slightly heated by other heat source, such as the excess electricity produced at low load period (usually in the night), or the combustion of a small amount of fuel, the said low-compression-ratio compressor is not needed. The expansion device 32 will be discussed later.

The cold fresh water is first used to remove the heat from the condenser 20 and then cooled by the brine through a heat exchanger 49. This cooled fresh water is then used for removing the heat from the absorber 22. An auxiliary system 18, attached to heat exchanger 14, may be provided for starting the prime mover and also for removing part of the exhaust heat from the prime mover, if one wishes. This auxiliary system 18 could be simply a tank of liquified air which may be produced by the power plant during low-load periods (usually at night).

Figure 5:
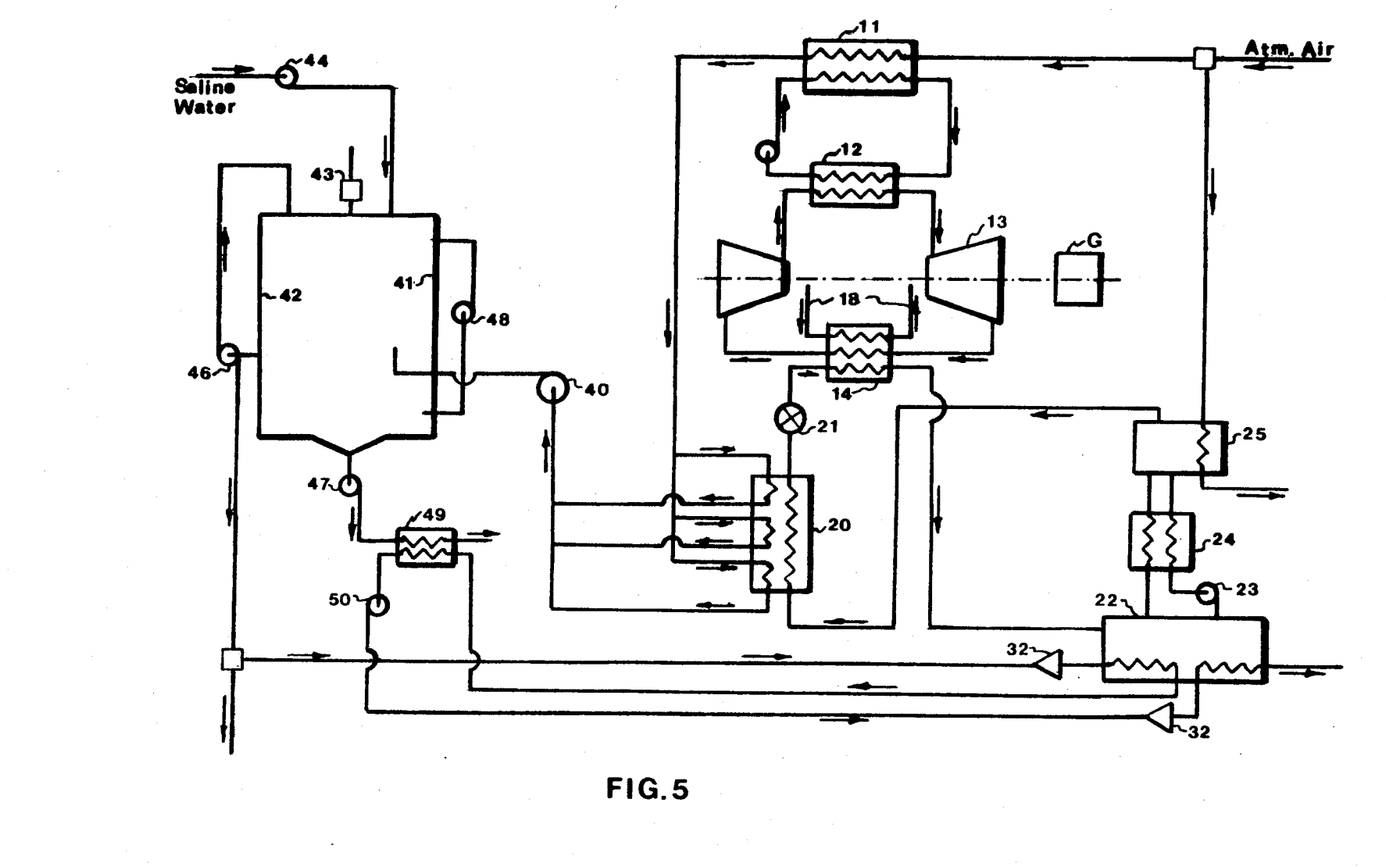
FIG. 5 is a flow diagram of a power plant similar to FIG. 4 wherein the atmosphere is used as the heat source.
Figure 6:
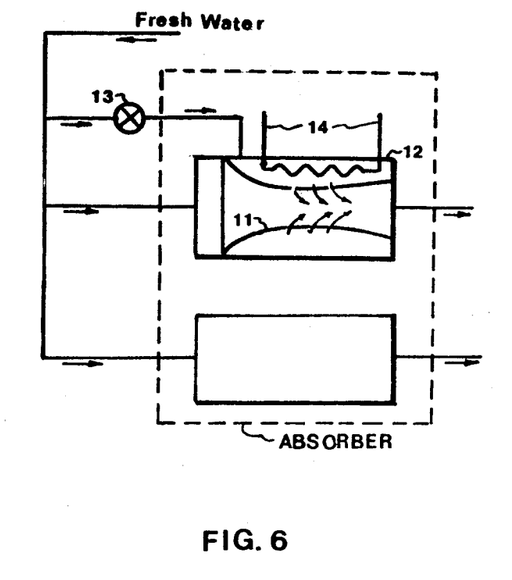
FIG. 6 shows one of many known methods for removing the large amount of heat from an absorption-refrigeration heat pump, e.g., the expansion device 32 in FIGS. 4 and 5.

FIG. 5 illustrate the flow diagram, in schematic form, of a power plant which extracts thermal energy from the atmosphere and is equipped with an absorption-refrigeration heat pump. The same numerals in FIGS. 5 and 4 represent the same components of the power plant. The temperature of the air effluent from the heat exchanger 11 can be in the cryogenic level. Part of this cold air can be used for desalination and the remainder for removing the heat from the condenser 20. In order to have the heat removed from the condenser at almost constant temperature multiple parallel passages of the cold air may be employed as shown in the figure. The fresh water produced therefrom is used to cool the absorber 22.

In view of the large amount of heat to be removed from the absorption-refrigeration heat pump, a slight change of phase of the fresh water from liquid to vapor may be allowed. One of many methods is to use expansion device as shown schematically in FIG. 6. The cold fresh water flows into a convergent conduit 11 whose throat is perforated with small holes in fluid communication with the jacket 12. A fraction of the fresh water is diverted through valve 13 into the jacket 12 where it evaporates. This vapor will be carried by the high speed flowing liquid to the environment before it condenses. Element 14 represents a part of the heat of solution that is removed by a fraction of the fresh water during change of phase.

Figure 7:
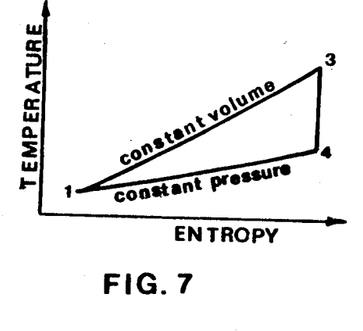
FIG. 7 shows a temperature-entropy diagram of Lenoir cycle.
Figure 8:
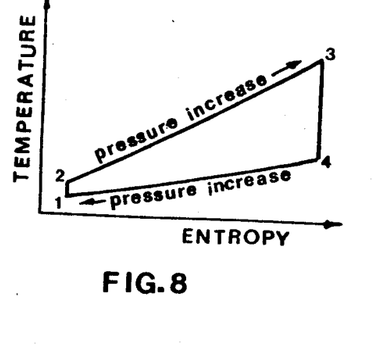
FIG. 8 is a temperature-entropy diagram of gas turbine cycle with compression flow heating and cooling.

In the power plants depicted in FIGS. 4 and 5, the prime mover may operate basically according to the Brayton cycle. If, however, the working fluid could follow the Lenoir cycle, as shown in FIG. 7, then the compressor 15 would not be needed. The constant-volume heating can be approximately achieved by known methods such as pulsating flow of the V-2 rocket in the second world war. The most efficient method is probably to employ the compression-flow heat exchanger which was disclosed in a copending application Ser. No. 499,286, filed May 31, 1983, now U.S. Pat. No. 4,516,402 and U.S. Pat. No. 4,433,545 of this applicant. In this referenced application and patent is disclosed a vortex cooler which can provide the cooling of the working fluid by a process between the isobaric and isothermal processes and a vortex heater which can provide the heating of the working fluid at a process of rapidly increasing pressure. The cycle is shown in FIG. 8. This cycle is more advantageous over the Brayton cycle for power plants in FIGS. 4 and 5, although the Brayton cycle can be used therein.

Conceivably, a vapor-refrigeration heat pump can be also employed in the power plants shown schematically in FIGS. 4 and 5, if the power cycle in FIG. 8 is employed (the engine operates in a temperature range much larger than that under which the heat pump is operated). In this case, however, a heat pump is not necessary. The flow diagram of such a power plant is illustrated, in schematic form, in FIG. 9 wherein the atmosphere is the heat source. The same numerals in FIGS. 9 and 5 designate the same units. The effluent cooled air from the heat exchanger 11 is partly diverted to the de-salination plant and partly to drive a system comprising a turbine 20, a scavenging pump 21 and a generator G'. The colder air effluent from the turbine 20 is employed for removing the exhaust heat from the prime mover. This power plant can operate by the Brayton cycle or the cycle in FIG. 8, but the latter is preferred.

Figure 9:
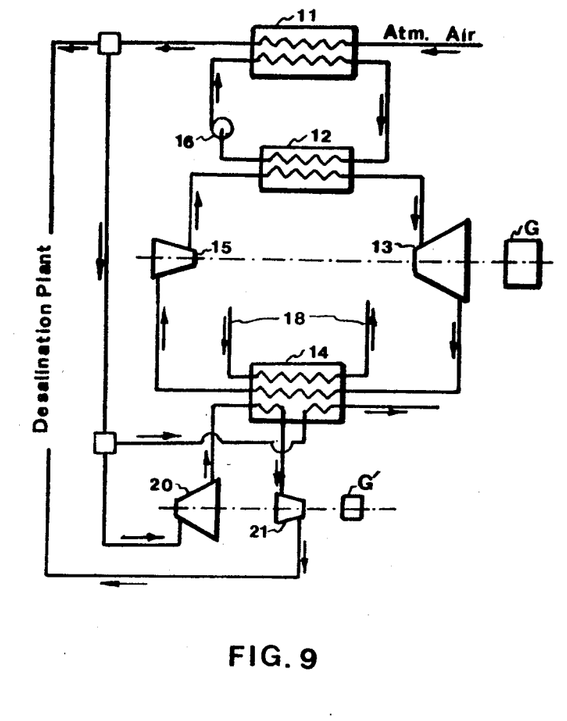
FIG. 9 illustrates a power plant, wherein the atmosphere is the heat source and an auxiliary turbine-compressor unit is employed for removing the exhaust heat of the prime mover.
Figure 10:
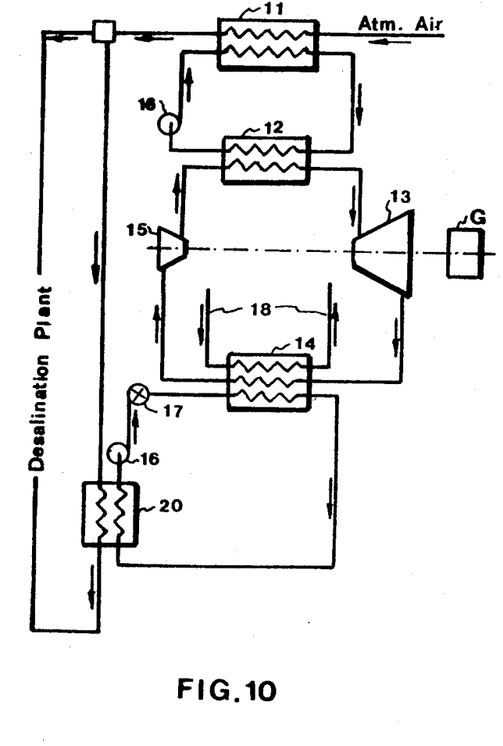
FIG. 10 shows a power plant, similar to FIG. 9, wherein the auxiliary turbine-compressor unit is replaced by a pressurized volatile fluid system for removing the exhaust heat from the prime mover.

FIG. 10 illustrates the flow diagram of a power plant which extracts the thermal energy from the atmosphere and operates in a cycle similar to that shown in FIG. 8. The same numerals in FIGS. 5, 9 and 10 represent the same units. In FIG. 10, the cooled air effluent from the heat exchanger 11 is partly diverted to de-salination plant and partly to the heat exchanger 20 in which a pressurized condensible vapor is condensed. The condensate is pumped through an expansion valve 17 by a pump 16 to the heat exchanger 14 where the condensate evaporates. Unlike a vapor-refrigeration heat pump, a vapor compressor is not required in FIG. 10, due to the small temperature change between states 1 and 2 in FIG. 8.

Figure 11:
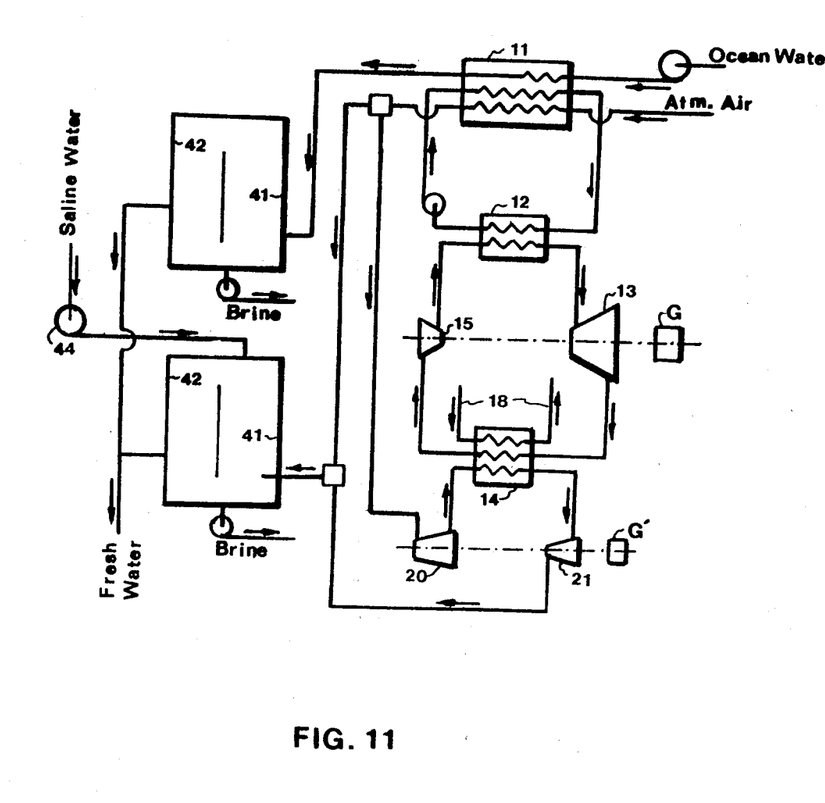
FIG. 11 is a flow diagram, in schematic form, of a power plant using both ocean and atmosphere as the heat source.

It is to be noted that the lowest temperature in the power plant illustrated in FIG. 4 is limited by the freezing point of saline water, while the highest temperature of the ocean surface would not be over 100° F. unless solar energy can be concentrated by collectors. The maximum thermal efficiency is thus limited below 10%. To increase the thermal efficiency, anti-freezing agent may be added to the source fluid (seawater), provided that it can be completely recovered during the de-salination process. An effective method for increasing the thermal efficiency of the prime mover and the productivity of the fresh water is the combined use of seawater and atmosphere as the source fluids, since the lowest temperature of the power plant can be in the cryogenic levels. In FIG. 11 is shown the flow diagram, in schematic form, of such a power plant. The same numerals in this figure and those in FIGS. 4-5 represent the same units, except those for the turbine-scavenging pump system which are the same as those in FIG. 9. Obviously, the turbine-scavenging pump system in FIG. 11 can be replaced by any other system for removing the exhaust heat from the prime mover; for instance, the condensible vapor system illustrated in FIG. 11.

In the figures described above, the working fluid has been considered as a pressurized permanent gas, such as air. Naturally, a pressurized condensible vapor can also be employed as the working fluid. In this case the power cycle will be basically the Rankine cycle.

This invention has described systems to draw thermal energy from the ocean, the atmosphere or from other sources, which are usually considered as passive or inert, such as lakes, rivers, water reservoirs and the like, which receives solar radiant heat to compensate for the heat that is continuously drawn out by the power plant. Sewage water from a city or industrial waste water can also be utilized for the production of power and conversion into usable water.

Although preferred embodiments of the present invention have been illustrated and described, changes will obviously occur to those skilled in the art. It is, therefore, intended that the present invention is to be limited only by the scope of the appended claims.

What is claimed is:

1. A method of utilizing the thermal energy of substantially limitless heat sources which are usually considered as inert heat sources, such as the atmosphere, the ocean, a lake, a river and the like, to power a power plant including (i) first heat exchange means operatively associated with the heat sources; (ii) a prime mover which includes a turbine and compression means operating in a closed power cycle operatively associated with the first heat exchange means, (iii) second heat exchange means operatively associated with the prime mover and (iv) an auxiliary system for starting the operation of the prime mover; said method comprising the steps of:
    (a) selecting first and second heat exchange means for providing appropriate heating and cooling processes of the power cycle so that the power plant is capable of producing net work with the continuous increase of entropy in the surroundings;
    (b) orienting the flow of source fluid from the heat sources so that the flow is moved by gravitational forces through the first heat exchange means wherein the source fluid heats the working fluid of the turbine and the source fluid is thereby cooled;
    (c) expanding the heated working fluid in the turbine;
    (d) cooling the expanded working fluid by the auxiliary system to start the prime mover and to initiate the continuous release of thermal energy from the heat sources;
    (e) cutting off the auxiliary system;
    (f) conducting the cooled source fluid effluent from the first heat exchange means to the second heat exchange means wherein the expanded working fluid is cooled by the cooled source fluid effluent;
    (g) compressing the cooled expanded working fluid back to the first heat exchange means wherein the compressed working fluid is heated by the source fluid as recited in step (b) for repeating steps (c) and (f); and
    (h) utilizing the cold source fluid effluent from the power plant for another cooling process.

2. The method of claim 1 wherein another cooling process includes a freezing process for liquid purification.

3. The method of claim 2 wherein the liquid purification process includes desalination of sea water.

4. The method of claim 3 wherein the second heat exchange means includes an absorption-refrigeration heat pump which draws thermal energy from the limitless heat sources and rejects heat to the cooled source fluid.

5. The method of claim 4 wherein the absorption-refrigeration heat pump is cooled by cold fresh water produced by desalination.

6. The method of claim 1 wherein the first heat exchange means includes one heat exchanger wherein the working fluid is heated at either constant or increasing pressure, and the second heat exchange means includes another heat exchanger and an expansion means, and the method further includes the steps of: further cooling a portion of the cooled source fluid by passing the cooled source fluid through the expansion means and utilizing the further-cooled portion of source fluid to cool the expanded working fluid of the prime mover in said another heat exchanger.

7. The method of claim 6 wherein the expansion means of the second heat exchange means includes a turbine which operates in an open cycle and the working fluid of said open-cycle turbine is the further-cooled portion of the source fluid.

8. The method of claim 1 wherein the first heat exchange means includes a heat exchanger wherein working fluid is heated at increasing pressure and the second heat exchange means includes a first heat exchanger and a second heat exchanger connected by a closed loop, the closed loop containing a volatile fluid and including a circulation pump and an expansion means, the volatile fluid being circulated through the first heat exchanger of the second heat exchange means to cool the expanded working fluid by evaporation and through the second heat exchanger of the second heat exchange means wherein the vapor of the volatile fluid undergoes a deceleration flow before it condenses into liquid, releasing heat to the cooled source fluid, the condensate being pumped through the expansion means to the said first heat exchanger of the second heat exchange means wherein the condensate evaporates.

* * * * *